(12) United States Patent
Yano et al.

(10) Patent No.: US 11,953,054 B2
(45) Date of Patent: Apr. 9, 2024

(54) BEARING CONDITION MONITORING DEVICE, TURBOCHARGER, AND BEARING CONDITION MONITORING METHOD

(71) Applicant: MITSUBISHI HEAVY INDUSTRIES ENGINE & TURBOCHARGER, LTD., Sagamihara (JP)

(72) Inventors: Seigi Yano, Tokyo (JP); Yuta Ishii, Sagamihara (JP); Jun Suzuki, Sagamihara (JP); Takaya Futae, Tokyo (JP); Shunsuke Yakushiji, Tokyo (JP); Yosuke Dammoto, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 255 days.

(21) Appl. No.: 17/432,997

(22) PCT Filed: Feb. 27, 2019

(86) PCT No.: PCT/JP2019/007679
§ 371 (c)(1),
(2) Date: Aug. 23, 2021

(87) PCT Pub. No.: WO2020/174632
PCT Pub. Date: Sep. 3, 2020

(65) Prior Publication Data
US 2022/0163061 A1    May 26, 2022

(51) Int. Cl.
*F16C 17/24*  (2006.01)
*F01D 25/12*  (2006.01)
(Continued)

(52) U.S. Cl.
CPC .......... *F16C 17/243* (2013.01); *F01D 25/125* (2013.01); *F01D 25/16* (2013.01);
(Continued)

(58) Field of Classification Search
CPC .... F16C 17/243; F16C 2360/24; F16C 17/18; F16C 33/1045; F16C 33/1065;
(Continued)

(56) References Cited

U.S. PATENT DOCUMENTS 5,485,491 A * 1/1996 Salnick ............... G07C 3/00
376/245
6,422,754 B1 * 7/2002 Dong ................. F16C 17/06
384/321

(Continued)

FOREIGN PATENT DOCUMENTS

CN      106715936 A    5/2017
JP      S58-217816 A   12/1983
(Continued)

OTHER PUBLICATIONS

Chinese Office Action and Search Report for Chinese Application No. 201980092453.2, dated Aug. 31, 2022.
(Continued)

*Primary Examiner* — James J Yang
(74) *Attorney, Agent, or Firm* — BIRCH, STEWART, KOLASCH & BIRCH, LLP

(57) ABSTRACT

A bearing condition monitoring device is a bearing condition monitoring device for monitoring a condition of a thrust bearing for holding a rotational shaft in a thrust direction. The bearing condition monitoring device includes a first temperature sensor for measuring a temperature of the thrust bearing, and an arithmetic device for counting a frequency at which an evaluation index of a thrust load on the basis of a measurement value by the first temperature sensor exceeds an allowable value, and for outputting an abnormality in the condition of the thrust bearing if the counted frequency exceeds a threshold. The arithmetic device may count, as the frequency, only a case where a state in which the thrust load (Continued)

exceeds an upper limit load continues for not less than a predetermined time.

13 Claims, 8 Drawing Sheets

(51) Int. Cl.
  *F01D 25/16* (2006.01)
  *F04D 29/056* (2006.01)
(52) U.S. Cl.
  CPC ........ *F04D 29/056* (2013.01); *F05D 2220/40* (2013.01); *F16C 2360/24* (2013.01)
(58) Field of Classification Search
  CPC ...... F01D 25/125; F01D 25/16; F04D 29/056; F05D 2220/40; F02B 2039/164; F02B 39/14
  See application file for complete search history.

(56) References Cited

U.S. PATENT DOCUMENTS

| | | | |
|---|---|---|---|
| 2004/0156567 A1 | 8/2004 | Gozdawa | |
| 2010/0239204 A1 | 9/2010 | Kaikogi et al. | |
| 2017/0108041 A1* | 4/2017 | Mayer | F16C 33/1075 |
| 2017/0276233 A1 | 9/2017 | Nishioka et al. | |
| 2018/0334917 A1* | 11/2018 | Nanda | F16C 19/525 |
| 2020/0347776 A1* | 11/2020 | Oklejas, Jr. | F01D 21/12 |

FOREIGN PATENT DOCUMENTS

| | | |
|---|---|---|
| JP | H03-78928 U | 8/1991 |
| JP | 4-96617 U | 8/1992 |
| JP | 2009-293593 A | 12/2009 |
| WO | WO 2008/054019 A1 | 5/2008 |

OTHER PUBLICATIONS

Office Action dated Jul. 5, 2022, issued in counterpart JP Application No. 2021-501473, with a machine translation.

* cited by examiner

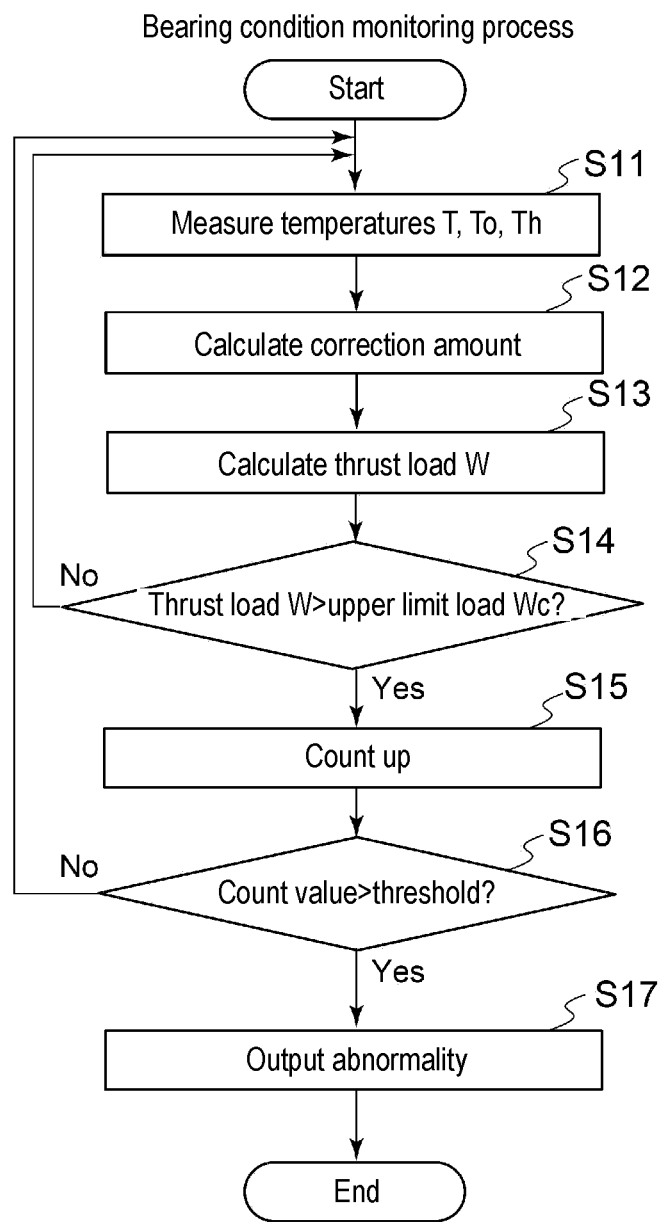

BEARING CONDITION MONITORING DEVICE, TURBOCHARGER, AND BEARING CONDITION MONITORING METHOD

TECHNICAL FIELD

The present disclosure relates to a bearing condition monitoring device, a turbocharger, and a bearing condition monitoring method.

BACKGROUND

A monitoring device is known which monitors a condition of a bearing for holding a rotating shaft in a rotary machine such as a turbine, an electric motor, a pump, an engine, or the like. For example, Patent Document 1, 2 discloses a monitoring device that includes a temperature sensor for measuring a bearing temperature of a journal bearing, and detects an abnormality in condition of the bearing by comparing a measurement value by the temperature sensor with an upper limit temperature which is an allowable limit.

CITATION LIST

Patent Literature

Patent Document 1: JPH4-96617U
Patent Document 2: WO2008/54019A

SUMMARY

Technical Problem

However, if a monitoring object is a thrust bearing, accuracy of abnormality detection may not be sufficient only by monitoring whether the bearing temperature exceeds the upper limit temperature as in Patent Document 1, 2. The thrust bearing of the turbocharger is applied with an axial load (thrust load) caused by a pressure balance between a turbine side and a compressor side. A load on the journal bearing is a load acting on the radially outer side, that is, in one direction, whereas the load on the thrust bearing can act on axially both sides, that is, in two directions.

For example, if the thrust bearing repeatedly fluctuates due to, exhaust pulsation of the engine or the like, the thrust bearing wears. If the thrust bearing wears, the rotational shaft moves in the axial direction, making it difficult to ensure a gap (tip clearance) with a blade.

Moreover, even if just one occurrence of an increase in bearing temperature associated with an increase in thrust load is not regarded as an abnormality, the repeated occurrence of the increase in bearing temperature may be regarded as the abnormality. The monitoring device of Patent Document 1, 2 merely compares the bearing temperature with the upper limit temperature and does not deal with determination of such abnormality. Thus, accuracy of abnormality detection is low.

In view of the above, an object of at least one embodiment of the present invention is to improve accuracy of abnormality detection in monitoring a bearing condition.

Solution to Problem (1) A bearing condition monitoring device according to at least one embodiment of the present invention is a bearing condition monitoring device for monitoring a condition of a thrust bearing for holding a rotational shaft in a thrust direction that includes a first temperature sensor for measuring a temperature of the thrust bearing, and an arithmetic device for counting a frequency at which an evaluation index of a thrust load on the basis of a measurement value by the first temperature sensor exceeds an allowable value, and for outputting an abnormality in the condition of the thrust bearing if the counted frequency exceeds a threshold.

With the above configuration (1), the abnormality is detected based on the frequency at which the evaluation index of the thrust load exceeds the allowable value. Thus, it is possible to improve accuracy of abnormality detection in monitoring the condition of the thrust bearing.

(2) In some embodiments, in the above configuration (1), the bearing condition monitoring device includes a storage device for storing reference data showing a relationship between the thrust load and the temperature of the thrust bearing. The arithmetic device calculates the thrust load from the measurement value by the first temperature sensor based on the reference data and counts the frequency at which the calculated thrust load serving as the evaluation index exceeds the allowable value.

With the above configuration (2), the thrust load is calculated, and the abnormality is detected based on the frequency at which the calculated thrust load exceeds the allowable value. Thus, it is possible to detect abnormality in the thrust bearing more directly.

(3) In some embodiments, in the above configuration (1) or (2), the arithmetic device counts, as the frequency, only a case where a state in which the evaluation index exceeds the allowable value continues for not less than a predetermined time.

Even if the evaluation index exceeds the allowable value, in a case where a duration of the exceedance is extremely short, the case may not be associated with the abnormality in the bearing condition. Thus, the exceedance of the allowable value in the extremely short time is preferably excluded from the count target.

In this regard, with the above configuration (3), the arithmetic device counts, as the frequency, only the case where the exceedance of the allowable value exceeds the predetermined time. Thus, it is possible to further improve accuracy of abnormality detection. The predetermined time is set as a time of a degree associated with the abnormality.

(4) In some embodiments, in any one of the above configurations (1) to (3), the bearing condition monitoring device includes a second temperature sensor for measuring a temperature of a bearing housing for housing the thrust bearing. The arithmetic device changes the evaluation index or the allowable value based on a measurement value by the second temperature sensor.

The temperature of the thrust bearing is influenced not only by friction heat accompanied by the bearing but also by an external temperature of the thrust bearing (for example, intake/exhaust heat of the compressor and the turbine). For example, even if the temperature of the thrust bearing fluctuates due to a fluctuation in external temperature of the thrust bearing, it may not be an abnormality in the thrust bearing itself. Moreover, in a case where the external temperature of the thrust bearing is high or low, an abnormality may be caused in the thrust bearing even if the temperature of the thrust bearing is normal.

In this regard, with the above configuration (4), the evaluation index which is the determination criterion of the abnormality or the allowable value is changed based on the temperature of the bearing housing. The temperature of the bearing housing is likely to be in conjunction with the external temperature of the bearing, rather than with the friction heat in the bearing. Thus, with the above configuration, it is possible to correct the determination criterion of the abnormality based on the external temperature of the bearing, and to further improve accuracy of abnormality detection in monitoring the condition of the thrust bearing.

(5) In some embodiments, in any one of the above configurations (1) to (4), the bearing condition monitoring device includes a third temperature sensor for measuring a temperature of lubricant oil taking heat away from the thrust bearing. The arithmetic device changes the evaluation index or the allowable value based on a measurement value by the third temperature sensor.

The temperature of the thrust bearing is influenced not only by friction heat accompanied by the bearing but also by the temperature of the lubricant oil taking heat away from the thrust bearing. In this regard, in the above configuration (5), the evaluation index or the allowable value is changed based on the temperature of the lubricant oil. Thus, with the above configuration (5), it is possible to correct the determination criterion of the abnormality based on the temperature of the lubricant oil, and to further improve accuracy of abnormality detection in monitoring the condition of the thrust bearing.

(6) In some embodiments, in any one of the above configurations (1) to (5), the arithmetic device acquires a flow velocity of lubricant oil taking heat away from the thrust bearing, and changes the evaluation index or the allowable value based on the acquired flow velocity.

The temperature of the thrust bearing is influenced not only by friction heat accompanied by the bearing but also by the flow velocity of the lubricant oil taking heat away from the thrust bearing. In this regard, in the above configuration (6), the evaluation index or the allowable value is changed based on the flow velocity of the lubricant oil. Thus, with the above configuration (6), it is possible to correct the determination criterion of the abnormality based on the flow velocity of the lubricant oil, and to further improve accuracy of abnormality detection in monitoring the condition of the thrust bearing.

(7) In some embodiments, in any one of the above configurations (1) to (6), the arithmetic device acquires a rotation speed of a turbocharger provided with the thrust bearing, and changes the evaluation index or the allowable value based on the acquired rotation speed of the turbocharger.

The temperature of the thrust bearing is influenced not only by friction heat accompanied by the bearing but also by the rotation speed of the turbocharger provided with the thrust bearing. In this regard, in the above configuration (7), the evaluation index or the allowable value is changed based on the rotation speed of the turbocharger. Thus, with the above configuration (6), it is possible to correct the determination criterion of the abnormality based on the rotation speed of the turbocharger, and to further improve accuracy of abnormality detection in monitoring the condition of the thrust bearing.

(8) In some embodiments, in any one of the above configurations (1) to (7), the arithmetic device acquires a parameter regarding a condition of an engine which is mounted with a turbocharger provided with the thrust bearing, and changes the evaluation index or the allowable value based on the acquired parameter regarding the condition of the engine.

The temperature of the thrust bearing is influenced not only by friction heat accompanied by the bearing but also by the parameter regarding the condition of the engine. In this regard, in the above configuration (8), the evaluation index or the allowable value is changed based on the parameter regarding the condition of the engine. Thus, with the above configuration (8), it is possible to correct the determination criterion of the abnormality based on the parameter regarding the condition of the engine, and to further improve accuracy of abnormality detection in monitoring the condition of the thrust bearing.

(9) A turbocharger according to at least one embodiment of the present invention includes a rotational shaft, a compressor wheel disposed at one end of the rotational shaft, a turbine wheel disposed at another end of the rotational shaft, a thrust bearing for holding the rotational shaft in a thrust direction, and the bearing condition monitoring device according to any one of the above configurations (1) to (8).

With the above configuration (9), by the bearing condition monitoring device according to any one of the above configurations (1) to (8), it is possible to improve accuracy of abnormality detection in monitoring a bearing condition.

(10) A bearing condition monitoring method according to at least one embodiment of the present invention is a bearing condition monitoring method for monitoring a condition of a thrust bearing for holding a rotational shaft in a thrust direction that includes a first temperature measurement step of measuring a temperature of the thrust bearing, a calculation step of calculating a thrust load on the basis of a measurement value of the temperature of the thrust bearing, a count step of counting a frequency at which an evaluation index of the thrust load calculated in the calculation step exceeds an allowable value, and an output step of outputting an abnormality in the condition of the thrust bearing if the frequency counted in the count step exceeds a threshold.

With the above method (10), the abnormality is detected based on the frequency at which the evaluation index exceeds the allowable value. Thus, it is possible to improve accuracy of abnormality detection in monitoring the condition of the thrust bearing.

Advantageous Effects

According to at least one embodiment of the present invention, it is possible to improve accuracy of abnormality detection in monitoring a bearing condition.

BRIEF DESCRIPTION OF DRAWINGS

FIG. 8 is a flowchart showing an example of a bearing condition monitoring process performed by the bearing condition monitoring device according to an embodiment of the present invention.

DETAILED DESCRIPTION

Figure 1:
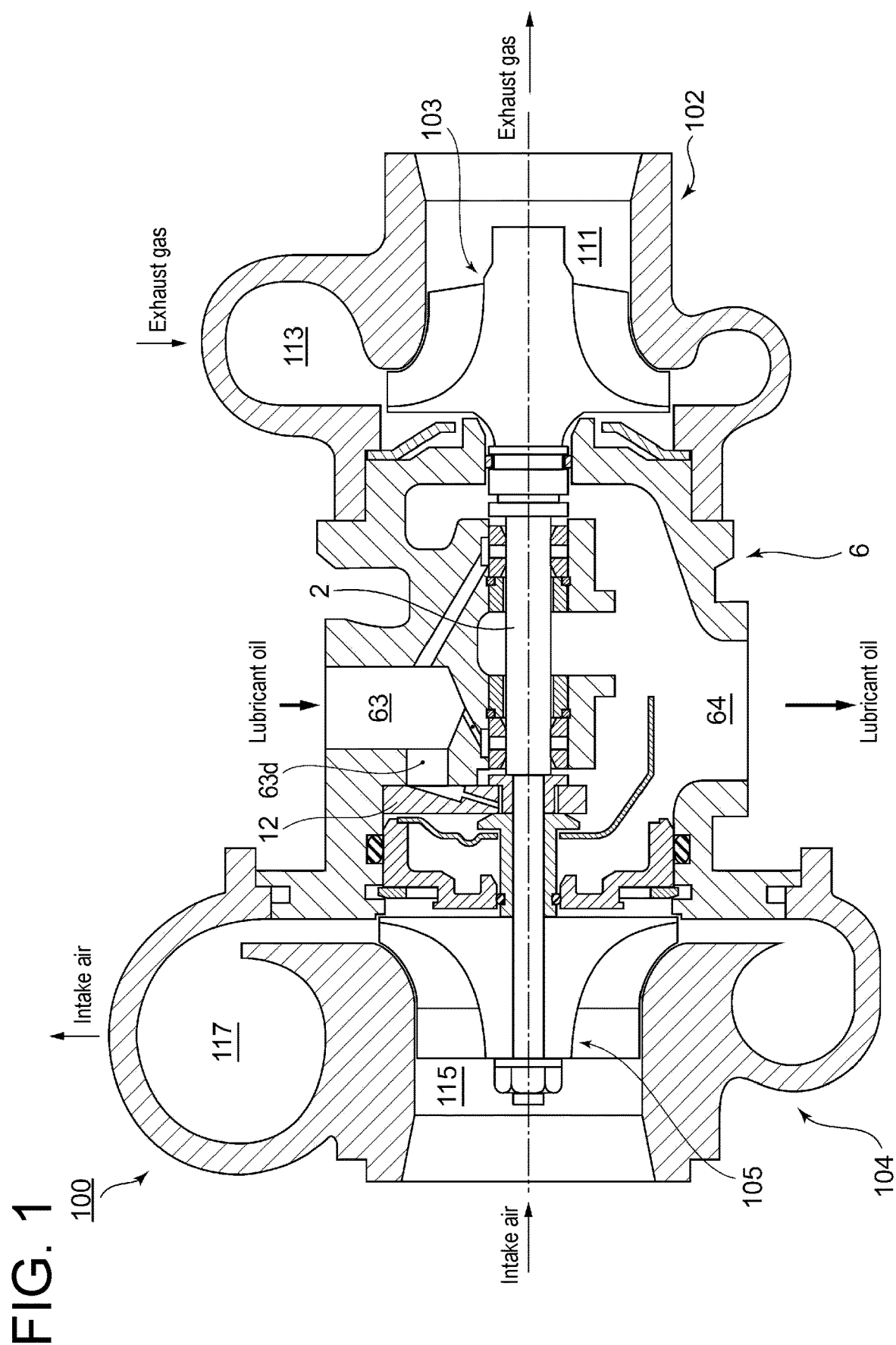
FIG. 1 is a schematic cross-sectional view of a turbocharger taken along an axis of a rotational shaft thereof according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a schematic cross-sectional view of a turbocharger 100 taken along an axis of a rotational shaft 2 thereof according to an embodiment of the present invention. The turbocharger 100 is mounted on, for example, an automobile engine.

As shown in FIG. 1, the turbocharger 100 includes the rotational shaft 2, a turbine housing 102 for housing a turbine wheel 103 disposed at one end of the rotational shaft 2, a compressor housing 104 for housing a compressor wheel 105 disposed at another end of the rotational shaft 2, and a bearing housing 106 for housing a thrust bearing 12 for holding the rotational shaft 2 in a thrust direction.

In the circumference of the turbine housing 102, a turbine scroll flow passage 113 of a spiral shape is formed. An exhaust gas flowing through the turbine scroll flow passage 113 and acting on the turbine wheel 103 is discharged to the outside of the turbine housing 102 from an exhaust gas outlet 111 opening in the axial direction of the rotational shaft 2. In the circumference of the compressor housing 104, a compressor scroll flow passage 117 of a spiral shape is formed. An intake gas flowing through an intake inlet 115 opening in the axial direction of the rotational shaft 2 and compressed by the compressor wheel 105 flows through the compressor scroll flow passage 117 to be supplied to an engine (not shown).

The bearing housing 6 is coupled at one end to the turbine housing 102 and is coupled at another end to the compressor housing 104. The bearing housing 6 internally forms an interior space making the rotational shaft 2 insertable in the axial direction, and the thrust bearing 12 is accommodated in the interior space.

The bearing housing 6 has an oil supply port 63 for supplying lubricant oil and an oil drain port 64 for draining the lubricant oil to the outside. The oil supply port 63 is externally supplied with the lubricant oil. A part of the lubricant oil supplied to the oil supply port 63 is supplied to the thrust bearing 12 via a thrust-side oil supply port 63*d* and is drained from the oil drain port 64 to the outside of the bearing housing 6.

Figure 2:
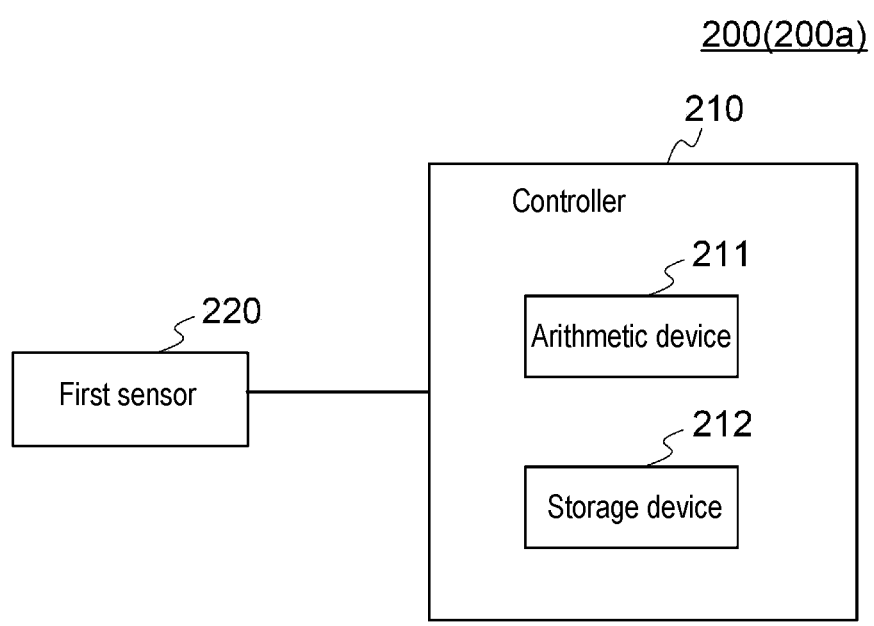
FIG. 2 is a block diagram showing the configuration of a bearing condition monitoring device according to an embodiment of the present invention.

The turbocharger 100 having such configuration further includes a bearing condition monitoring device 200 for monitoring a condition of the thrust bearing 12. FIG. 2 is a block diagram showing the configuration of the bearing condition monitoring device 200 (200*a*) according to an embodiment of the present invention.

As shown in FIG. 2, the bearing condition monitoring device 200 (200*a*) includes a controller 210 including an arithmetic device 211 and a storage device 212, and a first temperature sensor 220 for measuring a temperature of the thrust bearing 12. For example, the controller 210 is disposed outside the turbocharger 100, and the first temperature sensor 220 is disposed at a position of the thrust bearing 12 inside the turbocharger 100.

The arithmetic device 211 includes, for example, a processor such as a central processing unit (CPU) and a graphics processing unit (GPU). The storage device 212 includes, for example, a random access memory (RAM) and a read only memory (ROM).

The arithmetic device 211 performs various processes by executing programs stored in the storage device 212. The arithmetic device 211 calculates a thrust load W (an evaluation index of the thrust load W) based on a measurement value of a temperature T of the thrust bearing 12 by the first temperature sensor 220. The arithmetic device 211 counts a frequency at which the calculated thrust load W exceeds an upper limit load Wc (allowable value).

The arithmetic device 211 outputs an abnormality in the condition of the thrust bearing 12 if the counted frequency exceeds a threshold. For example, if an output device such as a display or a loudspeaker is connected, the arithmetic device 211 presents, to a user, information indicating whether there is the abnormality in the condition of the thrust bearing 12 via the output device.

The storage device 212 stores, for example, data showing the upper limit load Wc, threshold data showing a count serving as a determination criterion of the abnormality, reference data for calculating the thrust load W from the temperature T of the thrust bearing 12, count data showing a frequency at which the thrust load exceeds the upper limit load, and programs for performing a bearing condition monitoring process to be described later. The reference data will be described here.

Figure 3:
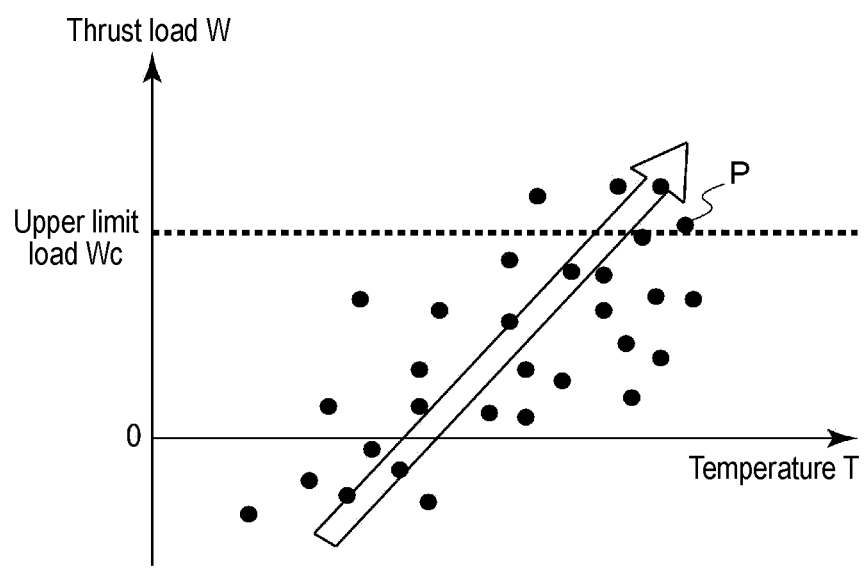
FIG. 3 is a conceptual graph for describing reference data stored in the bearing condition monitoring device according to an embodiment of the present invention.

FIG. 3 is a conceptual graph for describing the reference data stored in the bearing condition monitoring device 200 (200*a*) according to an embodiment of the present invention. In the graph, the ordinate indicates the thrust load W, and the abscissa indicates the temperature T of the thrust bearing 12. Each plot P is a measurement result obtained in a test performed in advance. The plurality of plots P form a scatter plot showing the relationship between the thrust load W and the temperature T of the thrust bearing 12. As indicated by an arrow, the thrust load W increases in a positive direction as the temperature T increases. The reference data may be data showing the scatter plot or may be a function W=f(T) obtained by approximating the scatter plot. Alternatively, the reference data may be data on the basis of the scatter plot (for example, a conversion table of the temperature T and the thrust load W).

In FIG. 3, a load in a direction toward the side of the compressor wheel 105 is positive, and a load in a direction toward the side of the turbine wheel 103 is negative. That is, a positive/negative polarity according to the direction of the load is discriminated. However, the reference data is not limited thereto, but may indicate the size of the thrust load W by an absolute value. Although FIG. 3 basically shows that the thrust load in the positive direction tends to increase as the temperature T is high, FIG. 3 shows that the thrust load in a negative direction also increases if the temperature T is extremely low.

The upper limit load Wc is a value preset as a load value where the thrust bearing 12 wears if the load is repeatedly applied to the thrust bearing 12. The bearing condition monitoring device 200 (200a) monitors the bearing condition based on the reference data and the temperature T of the thrust bearing 12 measured by the first temperature sensor 220. In FIG. 3, only the upper limit load Wc in the positive direction is set. However, the upper limit load Wc may be set in the negative direction.

Figure 4:
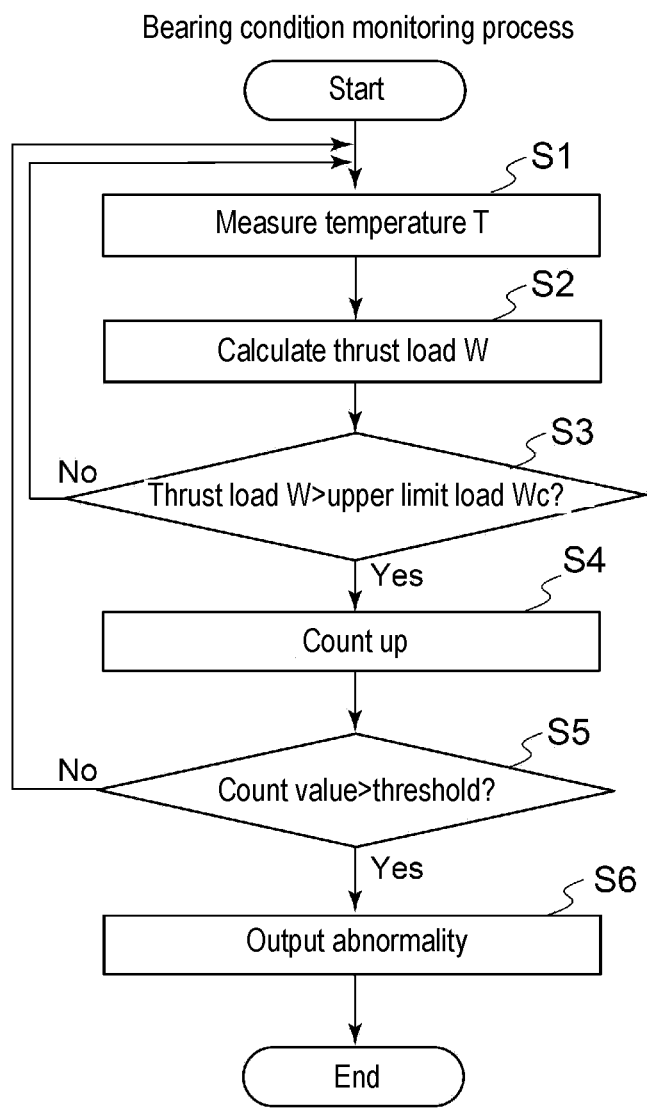
FIG. 4 is a flowchart showing an example of a bearing condition monitoring process performed by the bearing condition monitoring device according to an embodiment of the present invention.

The bearing condition monitoring process performed by the bearing condition monitoring device 200 (200a) having the above-described configuration will be described below. FIG. 4 is a flowchart showing an example of the bearing condition monitoring process performed by the bearing condition monitoring device 200 (200a) according to an embodiment of the present invention.

As shown in FIG. 4, the bearing condition monitoring device 200 (200a) causes the first temperature sensor 220 to measure the temperature T of the thrust bearing 12 (step S1). The bearing condition monitoring device 200 (200a) calculates the thrust load W (evaluation index) from the measurement value of the temperature T based on the reference data (step S2).

The bearing condition monitoring device 200 (200a) determines whether the calculated thrust load W (evaluation index) is greater than the upper limit load Wc (allowable value) (step S3). If the bearing condition monitoring device 200 (200a) determines that the thrust load W is not greater than the upper limit load Wc (step S3; No), the bearing condition monitoring device 200 (200a) returns to step S1 to perform the process.

On the other hand, if the bearing condition monitoring device 200 (200a) determines that the thrust load W is greater than the upper limit load Wc (step S3; Yes), the bearing condition monitoring device 200 (200a) counts up (step S4). More specifically, the arithmetic device 21 increments a count value of the count data stored in the storage device 212 to update the count data.

The bearing condition monitoring device 200 (200a) determines whether the count value is greater than the threshold (step S5). If the bearing condition monitoring device 200 (200a) determines that the count value is not greater than the threshold (step S5; No), the bearing condition monitoring device 200 (200a) returns to step S1 to perform the process.

On the other hand, if the bearing condition monitoring device 200 (200a) determines that the count value is greater than the threshold (step S5; Yes), the bearing condition monitoring device 200 (200a) counts up to output the abnormality in the condition of the thrust bearing 12 (step S6). More specifically, the arithmetic device 211 outputs information indicating the abnormality in the condition of the thrust bearing 12 to the output device.

In the above embodiment, the abnormality is detected based on the measurement value of the temperature T of the thrust bearing 12. However, the temperature T of the thrust bearing 12 is influenced not only by friction heat accompanied by the bearing but also by other factors. A change in the temperature T of the thrust bearing 12 by the other factors may bear little relation to the abnormality in the thrust bearing 12. Thus, the bearing condition monitoring device 200 for monitoring the condition of the thrust bearing 12 with reference to not only the temperature T of the thrust bearing 12 but also the other factors will be described below.

Figure 5:
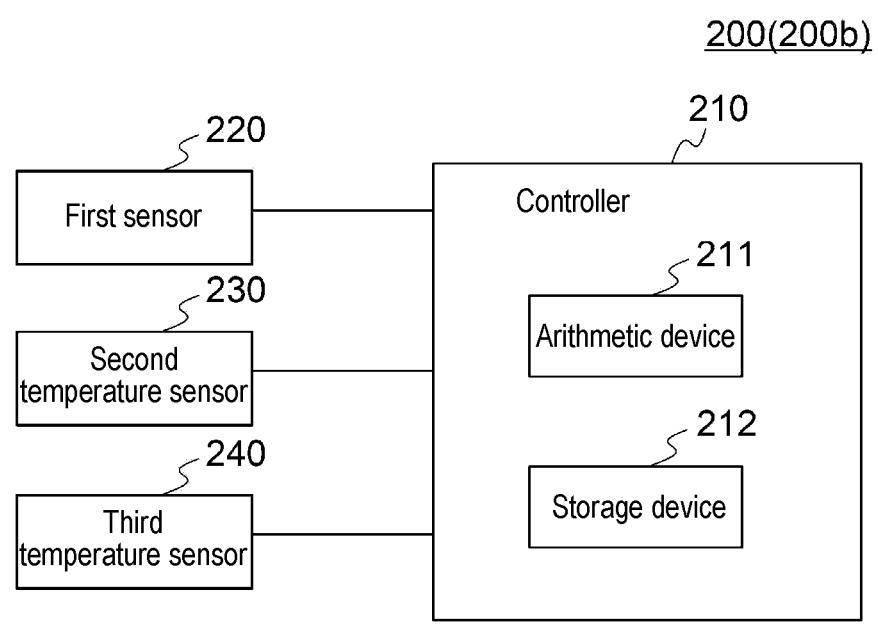
FIG. 5 is a block diagram showing the configuration of the bearing condition monitoring device according to an embodiment of the present invention.

FIG. 5 is a block diagram showing the configuration of the bearing condition monitoring device 200 (200b) according to an embodiment of the present invention. As shown in FIG. 5, the bearing condition monitoring device 200 (200b) includes the controller 210 including the arithmetic device 211 and the storage device 212, the first temperature sensor 220 for measuring the temperature of the thrust bearing 12, a second temperature sensor 230 for measuring a temperature Th of the bearing housing 6, and a third temperature sensor 240 for measuring a temperature To of the lubricant oil taking heat away from the thrust bearing 12.

Figure 6:
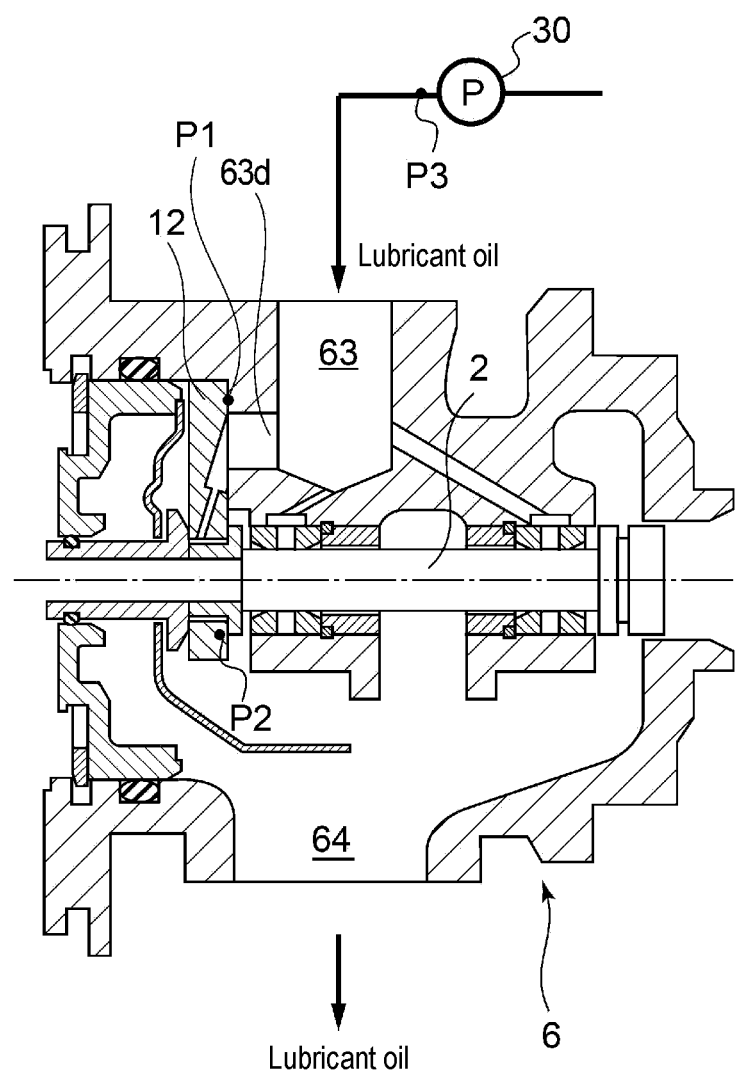
FIG. 6 is a schematic view for describing an arrangement example of temperature sensors in the bearing condition monitoring device according to an embodiment of the present invention.

FIG. 6 is a schematic view for describing an arrangement example of the temperature sensors (the first temperature sensor 220, the second temperature sensor 230, and the third temperature sensor 240) in the bearing condition monitoring device 200 (200b) according to an embodiment of the present invention. In FIG. 6, the first temperature sensor 220 is arranged at a position P1, the second temperature sensor 230 is arranged at a position P2, and the third temperature sensor is arranged at a position P3.

The position P1 is, for example, a position which is in contact with the thrust bearing 12. The position P1 may be a position which is not in contact with the thrust bearing 12, as long as the position P1 is a position close to the thrust bearing 12. That is, the position P1 may be a position capable of substantially measure the temperature of the thrust bearing 12.

The position P2 is, for example, a position at which the bearing housing 6 and the thrust bearing 12 contact each other. The position P2 may be a position which is not in contact with the bearing housing 6, as long as the position P2 is a position close to the bearing housing 6. For example, the position P2 may be a position closer to the bearing housing 6 than the position P1 in the thrust bearing 12. That is, the position P1 may be a position capable of substantially measure the temperature of the bearing housing 6.

The position P3 is, for example, a position on a sending side of a circulation pump 30 for circulating the lubricant oil. The position P3 may be another position. For example, the position P3 may be a position of the oil supply port 63, the oil drain port 64, or the like. That is, the position P3 may be a position capable of substantially measure the temperature of the lubricant oil.

In the bearing condition monitoring device 200 (200b), the arithmetic device 211 calculates the thrust load W (the evaluation index of the thrust load W) based on the measurement value of the temperature T of the thrust bearing 12 by the first temperature sensor 220. The arithmetic device 211 changes a calculation condition of the thrust load W based on a measurement value by the second temperature sensor 230 and a measurement value by the third temperature sensor 240. The arithmetic device 211 counts a frequency at which the changed thrust load W exceeds the upper limit load Wc (allowable value). The arithmetic device 211 outputs the abnormality in the condition of the thrust bearing 12 if the counted frequency exceeds the threshold.

In the bearing condition monitoring device 200 (200b), the storage device 212 stores, for example, the data showing the upper limit load Wc, the threshold data showing the count serving as the determination criterion of the abnormality, the reference data for calculating the thrust load W, the count data showing the frequency at which the calculated thrust load exceeds the upper limit load Wc, and the programs for performing the bearing condition monitoring process to be described later. The reference data will be described here.

Figure 7:
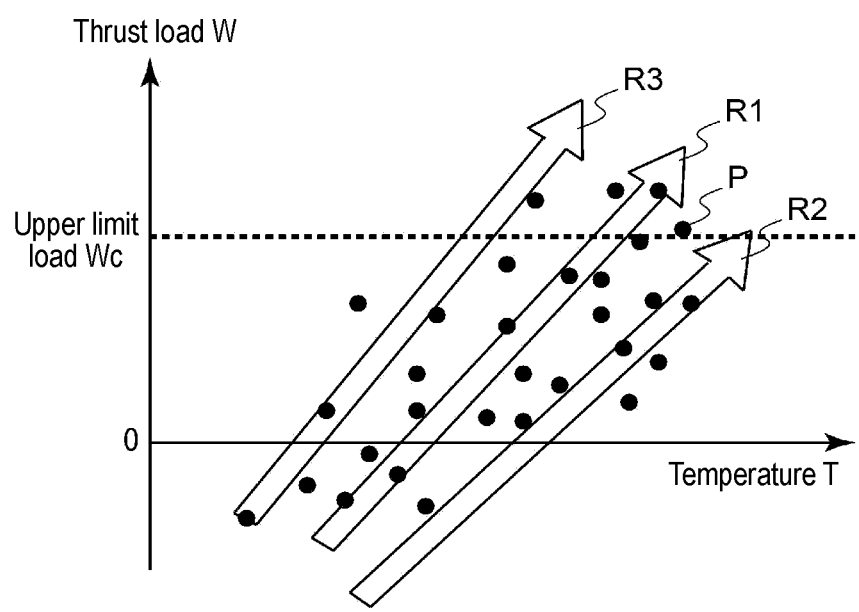
FIG. 7 is a conceptual graph for describing reference data stored in the bearing condition monitoring device according to an embodiment of the present invention.

FIG. 7 is a conceptual graph for describing the reference data stored in the bearing condition monitoring device 200 (200b) according to an embodiment of the present invention. In the graph, the ordinate indicates the thrust load W, and the abscissa indicates the temperature T of the thrust bearing 12. Each plot P is the measurement result obtained in the test performed in advance. The plurality of plots P form the scatter plot showing the relationship between the thrust load W and the temperature T of the thrust bearing 12.

As with the case of FIG. 3, the upper limit load Wc is preset as the load value where the thrust bearing 12 wears if the load is repeatedly applied to the thrust bearing 12. As indicated by a plurality of arrows R1, R2, and R3, the thrust load W increases in the positive direction as the temperature T increases. The reference data may be data showing the scatter plot or may be the function W=f(T) obtained by approximating the scatter plot. Alternatively, the reference data may be data on the basis of the scatter plot (for example, the conversion table of the temperature T and the thrust load W).

The reference data includes, for example, data on the function W=f(T) obtained by approximating the relationship between the thrust load W and the temperature T of the thrust bearing 12 shown by the scatter plot, and data for calculating a correction amount. In the function W=f(T), the thrust load W is changed by the temperature T. The correction amount is, for example, an amount of correcting the temperature relative to the measurement value of the temperature T of the thrust bearing 12. In this case, the correction amount of the temperature is calculated based on a measurement value of the temperature Th of the bearing housing 6 and a measurement value of the temperature To of the lubricant oil. The function for calculating the correction amount is $\Delta T = f(To, Th)$, and a correction amount $\Delta T$ of the temperature is changed by the temperature To, Th.

The meaning of the correction amount will be described here. First, the temperature T of the thrust bearing 12 is likely to be in a proportional relationship with the temperature Th of the bearing housing 6. Moreover, the temperature T of the thrust bearing 12 is likely to be in a proportional relationship with a logarithmic function $\log_e(To)$ of the temperature To of the lubricant oil. Thus, the temperature T is corrected to be low as the temperature Th is high. The temperature T is corrected to be low as the temperature To is high. Adding the correction amount $\Delta T$ to the temperature T of the thrust bearing 12, a fluctuation by the other factors (temperatures To, Th) is removed.

For example, as shown in FIG. 7, if the measurement value of the temperature T of the thrust bearing 12 is a temperature T1, the arithmetic device 211 calculates the thrust load W by substituting, into the function W=f(T), a temperature T2 after the correction amount $\Delta T$ is added to the temperature T1. The arithmetic device 211 may be configured to correct the function for calculating the thrust load W, instead of being configured to correct the temperature T by the correction amount $\Delta T$.

For example, the function may not be W=f(T) but be W=f(T, Th, To). In this case, as shown in FIG. 7, the relationship between the thrust load W and the temperature T may be changed in accordance with the temperature Th, To. For example, the arrow R1 indicating the relationship may be changed to the other arrow R2, R3. Moreover, since the distribution of the plots P varies, the arithmetic device 211 may generate a function for calculating the thrust load W by extracting the plots P used to generate an approximate expression in accordance with the temperature Th, To.

Thus, by the temperature To, Th, the calculation condition of the thrust load W is changed, and the evaluation index of the thrust load is changed. The reference data may not be the function but be the data on the basis of the scatter plot (for example, the conversion table of the thrust load W and the measurement value such as the temperature T, Th, To, or the like).

The bearing condition monitoring process performed by the bearing condition monitoring device 200 (200b) having the above-described configuration will be described below. FIG. 8 is a flowchart showing an example of the bearing condition monitoring process performed by the bearing condition monitoring device 200 (200b) according to an embodiment of the present invention.

As shown in FIG. 8, the bearing condition monitoring device 200 (200b) causes the first temperature sensor 220, the second temperature sensor 230, and the third temperature sensor 240 to measure the temperatures T, To, Th, respectively (step S11). The bearing condition monitoring device 200 (200b) uses the reference data to calculate the correction amount on the basis of the measurement value of the temperature To, Th (step S12). The bearing condition monitoring device 200 (200b) uses the reference data to calculate the thrust load W on the basis of the measurement value of the temperature T (step S13). The thrust load W is calculated by the calculation condition on which the correction amount is reflected.

The bearing condition monitoring device 200 (200b) determines whether the calculated thrust load W (evaluation index of the thrust load W) is greater than the upper limit load Wc (allowable value) (step S14). If the bearing condition monitoring device 200 (200b) determines that the thrust load W is not greater than the upper limit load Wc (step S14; No), the bearing condition monitoring device 200 (200b) returns to step S11 to perform the process.

On the other hand, if the bearing condition monitoring device 200 (200b) determines that the thrust load W is greater than the upper limit load Wc (step S14; Yes), the bearing condition monitoring device 200 (200b) counts up (step S15). More specifically, the arithmetic device 21 increments the count value of the count data stored in the storage device 212 to update the count data.

The bearing condition monitoring device 200 (200b) determines whether the count value is greater than the threshold (step S16). If the bearing condition monitoring device 200 (200b) determines that the count value is not greater than the threshold (step S6; No), the bearing condition monitoring device 200 (200b) returns to step S11 to perform the process.

On the other hand, if the bearing condition monitoring device 200 (200b) determines that the count value is greater than the threshold (step S16; Yes), the bearing condition monitoring device 200 (200b) outputs the abnormality in the condition of the thrust bearing 12 (step S17). More specifically, the arithmetic device 211 outputs the information indicating the abnormality in the condition of the thrust bearing 12 to the output device.

In some embodiments described above, the calculated thrust load W is the evaluation index of the thrust load W, and the upper limit load Wc is the allowable value. However, the evaluation index of the thrust load may be the measurement value of the temperature T of the thrust bearing 12 or the temperature T obtained by correcting the measurement value, and the allowable value may be the temperature T of the thrust bearing 12 at which the thrust load W reaches the upper limit load Wc.

Moreover, in some embodiments described above, the arithmetic device 211 counts a frequency at which the upper limit load Wc in the positive direction is exceeded. However, an upper limit load Wc1 (first allowable value) in the positive direction and an upper limit load Wc2 (second allowable value) in the negative direction may be set separately, and the arithmetic device 211 may count a frequency at which the allowable value is exceeded for each of the positive and negative directions. The upper limit load Wc1 and the upper limit load Wc2 may be set at different sizes. In this case, it is also possible to grasp the size and direction of the thrust load W. Thus, it is possible to detect an abnormality of whether each of a surface on the side of the compressor wheel 105 and a surface on the side of the turbine wheel 103 wears in the thrust bearing 12.

The bearing condition monitoring device 200 according to at least one embodiment of the present invention includes, for example, as shown in FIGS. 1 to 8, the first temperature sensor 220 for measuring the temperature of the thrust bearing 12, and the arithmetic device 211 for counting the frequency at which the evaluation index of the thrust load W on the basis of the measurement value by the first temperature sensor 220 exceeds the allowable value, and for outputting the abnormality in the condition of the thrust bearing 12 if the counted frequency exceeds the threshold.

With the above configuration, the abnormality is detected based on the frequency at which the evaluation index of the thrust load W exceeds the allowable value. Thus, it is possible to improve accuracy of abnormality detection in monitoring the condition of the thrust bearing 12.

In some embodiments, the bearing condition monitoring device 200 includes, for example, as shown in FIGS. 1 to 8, the storage device 212 for storing the reference data showing the relationship between the thrust load W and the temperature T of the thrust bearing 12, and the arithmetic device 211 calculates the thrust load W from the measurement value by the first temperature sensor 220 based on the reference data and counts the frequency at which the calculated thrust load W serving as the evaluation index exceeds the allowable value.

With the above configuration, the thrust load W is calculated, and the abnormality is detected based on the frequency at which the calculated thrust load W exceeds the allowable value. Thus, it is possible to detect abnormality in the thrust bearing more directly.

Meanwhile, even if the evaluation index of the thrust load W exceeds the allowable value, in a case where a duration of the exceedance is extremely short, the case may not be associated with the abnormality in the bearing condition. Thus, the exceedance of the allowable value in the extremely short time is preferably excluded from the count target.

Thus, in some embodiments, the arithmetic device 211 may be configured to count, as a frequency, only a case where a state in which the evaluation index of the thrust load W exceeds the allowable value continues for not less than a predetermined time.

In this case, the arithmetic device 221 counts, as the frequency, only the case where the exceedance of the allowable value exceeds the predetermined time. Thus, it is possible to further improve accuracy of abnormality detection. The predetermined time is set as a time of a degree associated with the abnormality.

Meanwhile, the temperature T of the thrust bearing 12 is influenced not only by friction heat accompanied by the bearing but also by an external temperature of the thrust bearing 12 (for example, intake/exhaust heat of the compressor and the turbine). For example, even if the temperature T of the thrust bearing 12 fluctuates due to a fluctuation in external temperature of the thrust bearing 12, it may not be an abnormality in the thrust bearing 12 itself. Moreover, in a case where the external temperature of the thrust bearing 12 is high or low, an abnormality may be caused in the thrust bearing 12 even if the temperature of the thrust bearing 12 is normal.

In this regard, in some embodiments, for example, as shown in FIGS. 5 to 8, the bearing condition monitoring device 200 includes the second temperature sensor 230 for measuring the temperature Th of the bearing housing 6 for housing the thrust bearing 12, and the arithmetic device 211 changes the calculation condition of the thrust load W based on the measurement value by the second temperature sensor 230 and changes the evaluation index of the thrust load W. The arithmetic device 211 may be configured to change not the evaluation index of the thrust load W but the allowable value (upper limit load Wc).

In these configurations, the evaluation index of the thrust load W which is the determination criterion of the abnormality or the allowable value is changed based on the temperature Th of the bearing housing 6. The temperature Th of the bearing housing 6 is likely to be in conjunction with the external temperature of the bearing, rather than with friction heat in the bearing. Thus, with the above configurations, it is possible to correct the determination criterion of the abnormality based on the external temperature of the bearing, and to further improve accuracy of abnormality detection in monitoring the condition of the thrust bearing 12.

Moreover, in some embodiments, for example, as shown in FIGS. 5 to 8, the bearing condition monitoring device 200 includes the third temperature sensor 240 for measuring the temperature of the lubricant oil taking heat away from the thrust bearing 12, and the arithmetic device 211 changes the calculation condition of the thrust load W based on the measurement value by the third temperature sensor 240 and changes the evaluation index of the thrust load W. The arithmetic device 211 may be configured to change not the evaluation index of the thrust load W but the allowable value (upper limit load Wc).

The temperature T of the thrust bearing 12 is influenced not only by friction heat accompanied by the bearing but also by the temperature To of the lubricant oil taking heat away from the thrust bearing 12. In this regard, in the above configuration, the evaluation index of the thrust load W or the allowable value is changed based on the temperature To of the lubricant oil. Thus, it is possible to correct the determination criterion of the abnormality based on the temperature To of the lubricant oil, and to further improve accuracy of abnormality detection in monitoring the condition of the thrust bearing 12.

The temperature T of the thrust bearing 12 is also influenced by a flow velocity F of the lubricant oil taking heat away from the thrust bearing 12, a rotation speed N of the turbocharger 100 provided with the thrust bearing 12, and a rotation speed Ne and a torque Tq of the engine. Thus, in steps S11 to S13 shown in FIG. 8, the arithmetic device 211 may acquire these parameters, and calculate the thrust load W on which the correction amount and the correction are reflected.

The arithmetic device 211 may acquire the flow velocity F of the lubricant oil from a measurement value by a flow velocity sensor or may acquire the flow velocity F of the lubricant oil based on an operational status of the circulation pump 30. The arithmetic device 211 may acquire the rotation speed N of the turbocharger 100 from a measurement value by a rotation speed measuring instrument or may acquire the rotation speed N calculated based on an operational status of the turbocharger 100. The arithmetic device 211 may acquire the rotation speed Ne and the torque Tq of the engine from a measurement values by a rotation speed measuring instrument and a torque measuring instrument or may acquire the rotation speed Ne and the torque Tq of the engine calculated based on an operational status of the engine.

In this case, for example, the correction amount of the temperature T is calculated based on at least any one of the parameters which are the flow velocity F of the lubricant oil, the rotation speed N, and the rotation speed Ne and the torque Tq. In this case, a function for calculating the correction amount is $\Delta T = f(F, N, Ne, Tq)$, and the correction amount $\Delta T$ of the temperature is changed by the flow velocity F, the rotation speed Ne, and the torque Tq. In calculation of the correction value, in addition to these parameters, the temperature Th or the temperature To described above may further be referred to.

The meaning of the above-described correction amount will be described here. First, the temperature T of the thrust bearing 12 is likely to be in a proportional relationship with the flow velocity F. The temperature T of the thrust bearing 12 is likely to be in a proportional relationship with exponentiation of the rotation speed N. The temperature T of the thrust bearing 12 is likely to be in a proportional relationship with the product of the rotation speed Ne and the torque Tq. Thus, the temperature T is corrected to be low as the flow velocity F is high. The temperature T is corrected to be low as the rotation speed N is high. The temperature T is corrected to be low as the product of the rotation speed Ne and the torque Tq is large. Adding the correction amount $\Delta T$ to the temperature T of the thrust bearing 12, a fluctuation by these parameters is removed.

For example, as shown in FIG. 7, if the measurement value of the temperature T of the thrust bearing 12 is the temperature T1, the arithmetic device 211 calculates the thrust load W by substituting, into the function $W=f(T)$, the temperature T2 after the correction amount $\Delta T$ is added to the temperature T1. The arithmetic device 211 may be configured to correct the function for calculating the thrust load W, instead of being configured to correct the temperature T by the correction amount $\Delta T$.

For example, the function may not be $W=f(T)$ but be $W=f(T, F, N, Ne, Tq)$. In this case, as shown in FIG. 7, the relationship between the thrust load W and the temperature T may be changed in accordance with the flow velocity F, the rotation speed N, the rotation speed Ne, and the torque Tq. For example, the arrow R1 indicating the relationship may be changed to the other arrow R2, R3. Moreover, since the distribution of the plots P varies, the arithmetic device 211 may generate a function for calculating the thrust load W by extracting the plots P used to generate an approximate expression in accordance with the flow velocity F, the rotation speed N, the rotation speed Ne, and the torque Tq.

Thus, in some embodiments, the arithmetic device 211 may be configured to acquire the flow velocity F of the lubricant oil taking heat away from the thrust bearing 12, change the calculation condition of the thrust load W based on the acquired flow velocity F, and change the evaluation index of the thrust load W. The arithmetic device 211 may be configured to change not the evaluation index of the thrust load W but the allowable value.

In this case, the arithmetic device 211 changes the evaluation index of the thrust load W or the allowable value based on the flow velocity F of the lubricant oil. Thus, it is possible to correct the determination criterion of the abnormality based on the flow velocity F of the lubricant oil, and to further improve accuracy of abnormality detection in monitoring the condition of the thrust bearing 12.

In some embodiments, the arithmetic device 211 may be configured to acquire the rotation speed N of the turbocharger 100 provided with the thrust bearing 12, change the calculation condition of the thrust load W based on the rotation speed N, and change the evaluation index of the thrust load W. The arithmetic device 211 may be configured to change not the evaluation index of the thrust load W but the allowable value.

In this case, the arithmetic device 211 changes the evaluation index of the thrust load W or the allowable value based on the rotation speed N of the turbocharger 100. Thus, it is possible to correct the determination criterion of the abnormality based on the rotation speed N of the turbocharger 100, and to further improve accuracy of abnormality detection in monitoring the condition of the thrust bearing 12.

In some embodiments, the arithmetic device 211 may be configured to acquire the rotation speed Ne and the torque Tq of the engine which is mounted with the turbocharger 100 provided with the thrust bearing 12, change the calculation condition of the thrust load W based on the rotation speed Ne and the torque Tq, and change the evaluation index of the thrust load W. The arithmetic device 211 may be configured to change not the evaluation index of the thrust load W but the allowable value.

In this case, the arithmetic device 211 changes the evaluation index of the thrust load W or the allowable value based on the rotation speed Ne and the torque Tq of the engine. Thus, it is possible to correct the determination criterion of the abnormality based on the rotation speed Ne and the torque of the engine, and to further improve accuracy of abnormality detection in monitoring the condition of the thrust bearing 12.

Moreover, the arithmetic device 211 may be configured to acquire, for example, an accelerator opening degree, a temperature of the engine (such as a temperature at a position, where a temperature increases in accordance with the torque Tq, of a casing, cylinder block, or the like of the engine), or a temperature of an exhaust gas, change the calculation condition of the thrust load W, and change the evaluation index of the thrust load W. That is, the arithmetic device 211 may be configured to acquire at least one parameter regarding the condition of the engine such as the rotation speed Ne and the torque Tq of the engine, the accelerator opening degree, the temperature of the engine, and the temperature of the exhaust gas, change the calculation condition of the thrust load W, and change the evaluation index of the thrust load W. With the above configuration, it is possible to correct the determination criterion of the abnormality based on the parameters regarding the condition of the engine, and to further improve accuracy of abnormality detection in monitoring the condition of the thrust bearing.

A bearing condition monitoring method according to at least one embodiment of the present invention includes, for example, as shown in FIGS. 4 and 8, the first temperature measurement step of measuring the temperature of the thrust bearing 12, the calculation step of calculating the thrust load W on the basis of the measurement value of the temperature of the thrust bearing 12, the count step of counting the frequency at which the evaluation index of the thrust load W calculated in the calculation step exceeds the allowable value, and the output step of outputting the abnormality in the condition of the thrust bearing 12 if the frequency counted in the count step exceeds the threshold.

With the above method, the abnormality is detected based on the frequency at which the evaluation index of the thrust load W exceeds the allowable value. Thus, it is possible to improve accuracy of abnormality detection in monitoring the condition of the thrust bearing 12.

The present invention is not limited to the above-described embodiments, and also includes an embodiment obtained by modifying the above-described embodiments and an embodiment obtained by combining these embodiments as appropriate.

REFERENCE SIGNS LIST

2 Rotational shaft
6 Bearing housing
12 Thrust bearing
30 Circulation pump
63 Oil supply port
63d Thrust-side oil supply port
64 Oil drain port
100 Turbocharger
102 Turbine housing
103 Turbine wheel
104 Compressor housing
105 Compressor wheel
111 Exhaust gas outlet
113 Turbine scroll flow passage
115 Intake inlet
117 Compressor scroll flow passage
200 Bearing condition monitoring device
210 Controller
211 Arithmetic device
212 Storage device
220 First temperature sensor
230 Second temperature sensor
240 Third temperature sensor

The invention claimed is:

1. A bearing condition monitoring device for monitoring a condition of a thrust bearing for holding a rotational shaft in a thrust direction, the device comprising:
a first temperature sensor for measuring a temperature of the thrust bearing; and
an arithmetic device for counting a frequency at which an evaluation index of a thrust load on the basis of a measurement value by the first temperature sensor exceeds an allowable value, and for outputting an abnormality in the condition of the thrust bearing if the counted frequency exceeds a threshold; and
a storage device for storing reference data showing a relationship between the thrust load and the temperature of the thrust bearing,
wherein the arithmetic device calculates the thrust load from the measurement value by the first temperature sensor based on the reference data and counts the frequency at which the calculated thrust load serving as the evaluation index exceeds the allowable value.

2. The bearing condition monitoring device according to claim 1,
wherein the arithmetic device counts, as the frequency, only a case where a state in which the evaluation index exceeds the allowable value continues for not less than a predetermined time.

3. A beating condition monitoring device for monitoring a condition of a thrust bearing for holding a rotational shaft in a thrust direction, the device comprising:
a first temperature sensor for measuring a temperature of the thrust bearing;
an arithmetic device for counting a frequency at which an evaluation index of a thrust load on the basis of a measurement value by the first temperature sensor exceeds an allowable value, and for outputting an abnormality in the condition of the thrust bearing if the counted frequency exceeds a threshold; and
a second temperature sensor for measuring a temperature of a bearing housing for housing the thrust bearing,
wherein the arithmetic device changes the evaluation index or the allowable value based on a measurement value by the second temperature sensor.

4. The bearing condition monitoring device according to claim 1, comprising a third temperature sensor for measuring a temperature of lubricant oil taking heat away from the thrust bearing,
wherein the arithmetic device changes the evaluation index or the allowable value based on a measurement value by the third temperature sensor.

5. A bearing condition monitoring device for monitoring a condition of a thrust bearing for holding a rotational shaft in a thrust direction, the device comprising:
a first temperature sensor for measuring a temperature of the thrust bearing; and
an arithmetic device for counting a frequency at which an evaluation index of a thrust load on the basis of a measurement value by the first temperature sensor exceeds an allowable value, and for outputting an abnormality in the condition of the thrust bearing if the counted frequency exceeds a threshold,
wherein the arithmetic device acquires a flow velocity of lubricant oil taking heat away from the thrust bearing, and changes the evaluation index or the allowable value based on the acquired flow velocity.

6. The bearing condition monitoring device according to claim 1,
wherein the arithmetic device acquires a rotation speed of a turbocharger provided with the thrust bearing, and changes the evaluation index or the allowable value based on the acquired rotation speed of the turbocharger.

7. The bearing condition monitoring device according to claim 1,
wherein the arithmetic device acquires a parameter regarding a condition of an engine which is mounted with a turbocharger provided with the thrust bearing, and changes the evaluation index or the allowable value based on the acquired parameter regarding the condition of the engine.

8. A turbocharger, comprising:
a rotational shaft;
a compressor wheel disposed at one end of the rotational shaft;
a turbine wheel disposed at another end of the rotational shaft;
a thrust bearing for holding the rotational shaft in a thrust direction; and
the bearing condition monitoring device according to claim 1.

9. A bearing condition monitoring method for monitoring a condition of a thrust bearing for holding a rotational shaft in a thrust direction, the method performed by a condition monitoring device, the method comprising:
a first temperature measurement step of measuring a temperature of the thrust bearing;
a calculation step of calculating a thrust load on the basis of a measurement value of the temperature of the thrust bearing;
a count step of counting a frequency at which an evaluation index of the thrust load calculated in the calculation step exceeds an allowable value; and
an output step of outputting an abnormality in the condition of the thrust bearing if the frequency counted in the count step exceeds a threshold,
wherein the calculation step includes a sub-step of calculating the thrust load from the temperature of the thrust bearing in the first temperature measurement step based on a reference data showing a relationship between the thrust load and the temperature of the thrust bearing and counting the frequency at which the calculated thrust load serving as the evaluation index exceeds the allowable value.

10. A turbocharger, comprising:
a rotational shaft;
a compressor wheel disposed at one end of the rotational shaft;
a turbine wheel disposed at another end of the rotational shaft;
a thrust bearing for holding the rotational shall in a thrust direction; and
the bearing condition monitoring device according to claim 3.

11. A turbocharger, comprising:
a rotational shaft;
a compressor wheel disposed at one end of the rotational shaft;
a turbine wheel disposed at another end of the rotational shaft;
a thrust bearing for holding the rotational shall in a thrust direction; and
the bearing condition monitoring device according to claim 5.

12. A bearing condition monitoring method for monitoring a condition of a thrust bearing for holding a rotational shaft in a thrust direction, the method performed by a condition monitoring device, the method comprising:
a first temperature measurement step of measuring a temperature of the thrust bearing;
a calculation step of calculating a thrust load on the basis of a measurement value of the temperature of the thrust bearing;
a count step of counting a frequency at which an evaluation index of the thrust load calculated in the calculation step exceeds an allowable value;
an output step of outputting an abnormality in the condition of the thrust bearing if the frequency counted in the count step exceeds a threshold;
a second temperature measurement step of measuring a temperature of a bearing housing for housing the thrust bearing; and
a change step of changing the evaluation index or the allowable value based on the temperature of the bearing housing in the second temperature measurement step.

13. A bearing condition monitoring method for monitoring a condition of a thrust bearing for holding a rotational shaft, in a thrust direction, the method performed by a condition monitoring device, the method comprising:
a first temperature measurement step of measuring a temperature of the thrust bearing;
a calculation step of calculating a thrust load on the basis of a measurement value of the temperature of the thrust bearing;
a count step of counting a frequency at which an evaluation index of the thrust load calculated in the calculation step exceeds an allowable value;
an output step of outputting an abnormality in the condition of the thrust bearing if the frequency counted in the count step exceeds a threshold;
an acquirement step of acquiring a flow velocity of lubricant oil taking heat away from the thrust bearing; and
a change step of changing the evaluation index or the allowable value based on the flow velocity.

* * * * *